Oct. 30, 1928. 1,689,787
G. KUPFERSCHMID
HOLDER FOR SOAP
Filed March 24, 1927
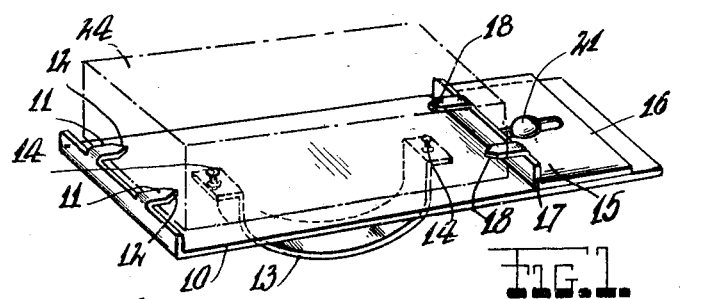
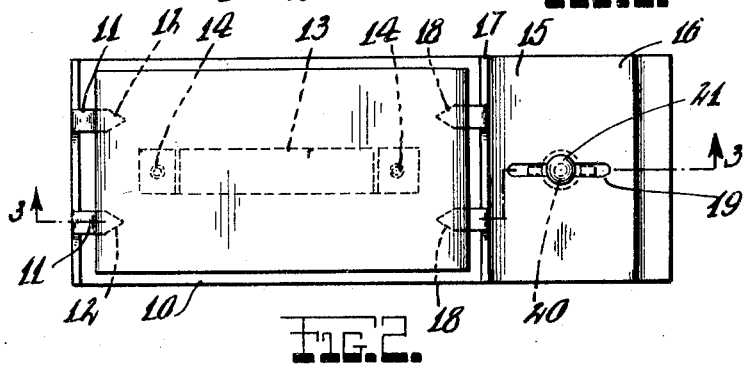
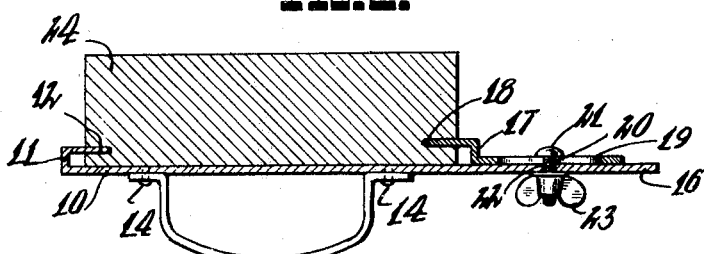
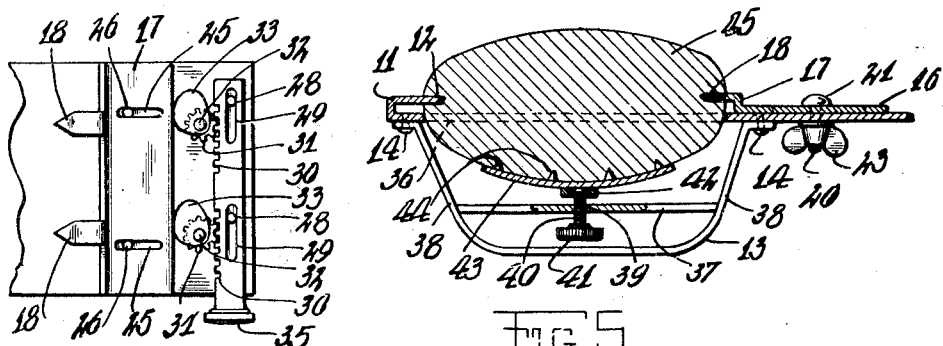
INVENTOR
Gebhard Kupferschmid
BY
ATTORNEY Patented Oct. 30, 1928.

1,689,787

UNITED STATES PATENT OFFICE.

GEBHARD KUPFERSCHMID, OF NEW YORK, N. Y.

HOLDER FOR SOAP.

Application filed March 24, 1927. Serial No. 178,043.

This invention relates to holders for soap and has for one of its objects the provision of a device adapted to be adjusted for accommodating cakes of soap of various sizes. Another object of my invention is the provision of means for securely clamping a cake of soap in a holder which may be conveniently manipulated.

A further object of my invention is the provision of a device for holding a cake of soap in fixed position to permit objects to be lathered to be rubbed thereover.

Other objects will appear hereinafter, the novel features and combinations being set forth in the appended claims.

Referring particularly to the drawings:

Fig. 1 is a perspective view of a soap holder showing a cake of soap clamped thereon.

Fig. 2 is a plan view of the soap holding device embodied in my invention.

Fig. 3 is a longitudinal sectional view taken on the line 3—3 of Fig. 2.

Fig. 4 is a fragmentary plan view of a modified form of my invention; and

Fig. 5 is a longitudinal view partly in section of a modified form of my invention.

Referring to Fig. 1, the numeral 10 designates a substantially flat base plate having an upwardly disposed end 11 which is provided with inwardly directed prongs 12. A handle 13 is attached to the plate 10 by rivets 14. As shown in Figs. 1 and 2, an adjustable bracket or jaw member 15 is slidably mounted on the upper side of the plate 10. This adjustable jaw member comprises a flat rear portion 16 and an upwardly disposed forward portion 17 which is provided with inwardly directed teeth or prongs 18. The jaw 15 is also provided with an elongated slot 19 through which the bolt 20 passes. The bolt 20 has a head 21 adapted to rest upon the upper surface of the jaw 15 as shown in Fig. 1, and is disposed through an opening 22 in the plate member 10. A thumb nut 23 is screw threaded on the other end of the bolt 20 for adjustably clamping the jaw 15 in a desired position.

It should be understood that a cake of soap, designated in Figs. 1 and 2 by the numeral 24, of substantially rectangular form may be placed upon the flat plate 10 and moved forwardly to the left forcing the prongs 12 into the end of the cake. With the cake securely fastened at its forward end, the rear adjustable jaw 15 may be moved forwardly for projecting the prongs 18 thereof into the rear end of the cake. When the adjustable jaw has been suitably positioned, the thumb nut 23 may be screwed down against the lower side of the plate member 10 to clamp the adjustable jaw firmly in a desired position. The device may be grasped by the handle 13 and moved relative to an object to be lathered or it may be held stationary while the object to be lathered is moved or rubbed over the soap.

In the modified form of my invention shown in Fig. 4, the adjustable jaw 15 is provided with spaced slots 25 through which pins 26 pass for slidably mounting the jaw on the plate 10, the pins 26 being secured to the plate 10. The ends of the pins 26 are planed over for preventing separation of the jaw from the plate 10. A rack bar 27 is slidably mounted by pins 28, which are disposed in slots 29 in said rack bar, on the rear end portion of the plate 10. This rack bar is provided with teeth 30 adapted to mesh with the teeth of the gears 31 which are rotatively mounted on the stud shafts 32. Cams 33 are rigidly secured to the gears 31 and are adapted to rotate in unison therewith on the stud shafts 32. The peripheries of the cams 33 are adapted to engage the edge 34 of the jaw 15 and force said jaw forwardly causing the prongs 18 to be embedded in the rear end of the cake of soap.

It should be understood that a handle member 35 is mounted on one end of the bar 27 by which said bar may be forced inwardly for imparting an anti-clockwise rotation to the gears 31 and the cams 33. When it is desired to remove the soap from the device, the bar 27 may be pulled out by manipulation of the handle 35. The outard movement of the bar 27 will impart a clockwise rotation to the gears 31 and the cams 33 causing the latter to be rotated away from the edge 34 of the jaw 15. The jaw 15 may thereafter be moved rearwardly for removing the prongs 18 from the soap.

In the modified form of my invention shown in Fig. 5, the plate 10 is provided with an oval opening 36 into which a cake of soap of irregular curvature may be placed. The plate 10 and the jaw 15 are identical in structure to that shown in Figs. 1 and 2 except that in the modified form shown in Fig. 5 the opening 36 is provided. A cross member 37 is disposed between and secured to the sides 38 of the handle 13 and is provided intermediate its ends with a threaded opening 39. A screw 40 is screw threaded in the opening 39 and is provided at its outer extremity with a knob 41 by which said screw may be adjusted. The other end of screw 40 is rotatively journaled in a socket member 42 mounted on a concave plate 43. The concave plate 43 is provided with prongs 44 which are adapted to be embedded in the soap 45. It should be understood that the concave plate 42 is adapted to engage and support the soap 45 and that said plate may be adjusted by manipulation of the knob 41 for positioning the soap suitably relative to the plate 10. When it is desired to position the soap further above the prongs 12 and 18, the screw 41 may be screwed inwardly for moving the plate 43 in the direction of the flat plate 10.

Having thus fully described and shown an embodiment of my invention, what is desired to be secured by Letters Patent of the United States is:

I claim:

1. In a soap holder, a plate comprising an upwardly disposed end portion, inwardly directed prongs on said upwardly directed end portion, an adjustable jaw slidably mounted on the rear end portion of said plate, prongs on said adjustable jaw, a rack bar slidably mounted on the end portion of said plate, spaced apart gears pivotally mounted on said plate adapted to mesh with the teeth of said rack bar, and cams rigidly attached to said gears adapted to rotate therewith and to engage the end of said adjustable jaw for forcing the same forwardly to cause the prongs of the jaw and the prongs of the forward end of said plate to be embedded in the ends of a cake of soap when said rack bar is moved inwardly.

2. In a soap holder, a plate comprising an upwardly disposed end portion, inwardly directed prongs on said upwardly directed end portion, an adjustable jaw slidably mounted on the rear end portion of said plate, prongs on said adjustable jaw, a rack bar slidably mounted on the end portion of said plate, by means of pins projecting from the plate and engaging in slots formed in the rack bar, spaced apart gears pivotally mounted on said plate adapted to mesh with the teeth of said rack bar, a handle mounted on one end of the rack bar, and cams rigidly attached to said gears adapted to rotate therewith, the peripheries of the cams being engaged against the edge of the adjustable jaw for forcing the same forwardly to cause the prongs of the jaw and the prongs of the forward end of said plate to be embedded in the ends of a cake of soap when said rack bar is moved inwardly.

In testimony whereof I have affixed my signature.

GEBHARD KUPFERSCHMID.